(12) United States Patent
Pelletier

(10) Patent No.: US 7,740,094 B2
(45) Date of Patent: Jun. 22, 2010

(54) SNOW GROOMER

(75) Inventor: Michel Pelletier, Quebec (CA)

(73) Assignee: Rolic Invest S.A.R.L., Luxembourg (LU)

( * ) Notice: Subject to any disclaimer, the term of this patent is extended or adjusted under 35 U.S.C. 154(b) by 11 days.

(21) Appl. No.: 12/126,300

(22) Filed: May 23, 2008

(65) Prior Publication Data

US 2009/0013562 A1 Jan. 15, 2009

(30) Foreign Application Priority Data

May 25, 2007 (IT) .......................... MI20070188 U

(51) Int. Cl.
*B62B 19/00* (2006.01)
(52) U.S. Cl. ........................... 180/184; 37/196; 37/219; 305/144
(58) Field of Classification Search ................. 180/184; 37/196, 219; 305/144
See application file for complete search history.

(56) References Cited

U.S. PATENT DOCUMENTS

| 3,386,778 | A | | 6/1968 | Rymes |
| 3,692,132 | A | | 9/1972 | Pollanen |
| 4,087,135 | A | | 5/1978 | Unruh |
| 4,458,954 | A | | 7/1984 | Haas |
| 4,458,955 | A | | 7/1984 | Webb |
| 5,062,493 | A | | 11/1991 | Platter |
| 6,810,609 | B2 * | | 11/2004 | Lassonde et al. ............... 37/236 |
| 2008/0269986 | A1 * | | 10/2008 | Regnell et al. ................. 701/37 |
| 2009/0000833 | A1 | | 1/2009 | Dorais |
| 2009/0007461 | A1 * | | 1/2009 | Pelletier et al. ............... 37/219 |

FOREIGN PATENT DOCUMENTS

| AT | 0395922 B | 4/1993 |
| CA | 2 211 050 | 1/1998 |
| DE | 2219623 | 11/1973 |
| DE | 2254276 A1 | 5/1974 |
| DE | 3534626 A1 | 3/1987 |
| DE | 29515866 | 11/1995 |
| DE | 29515866 U1 | 1/1996 |

(Continued)

OTHER PUBLICATIONS

European Search Report from corresponding foreign application (EP07110121), dated Oct. 2, 2008.
Everest Parkdesigner Catalog, published on the internet, Apr. 2003.
Scout PistenBully Brochure, published Jan. 2006.

(Continued)

*Primary Examiner*—Lesley Morris
*Assistant Examiner*—Tashiana Adams
(74) *Attorney, Agent, or Firm*—K&L Gates LLP

(57) ABSTRACT

A snow groomer having a frame extending along a longitudinal axis; ten supporting wheels connected to the frame by respective axle shafts to form a row of five supporting wheels on each longitudinal side of the frame, each supporting wheel on one longitudinal side of the frame facing a supporting wheel on the opposite longitudinal side of the frame, so that facing pairs of supporting wheels define a first, second, third, fourth, and fifth axle; two tracks, each looped about the supporting wheels aligned along a respective longitudinal side of the frame; an engine assembly of over 430 HP; and a mass distributed as follows: 16%+/−2% on the first axle; 20%+/−2% on the second axle; 20%+/−2% on the third axle; 22%+/−2% on the fourth axle; and 22%+/−2% on the fifth axle.

11 Claims, 2 Drawing Sheets

FOREIGN PATENT DOCUMENTS

| | | |
|---|---|---|
| DE | 19 629 454 | 1/1998 |
| DE | 10320523 A1 | 11/2004 |
| EP | 1908672 A1 | 4/2008 |
| FR | 75 39445 A1 | 7/1977 |
| FR | 2336292 | 7/1977 |
| FR | 2586727 A1 | 3/1987 |
| JP | 7-237566 A2 | 9/1995 |

OTHER PUBLICATIONS

BR 180 Fact Sheet, Everest Parkdesigner Catalog, published on the Internet, 2006.
BR 350 Fact Sheet, published on the Internet, 2006.
PistenBully 600 Catalog, published in Germany, Feb. 2006.
PistenBully Scout Catalog, published in Germany, Jan. 2008.
Everest Parkdesigner Catalog, published on the Internet, Apr. 2003.

* cited by examiner

SNOW GROOMER

PRIORITY CLAIM

This application claims the benefit of and priority to Italian Application No. MI2007U 000188, filed May 25, 2007, the entire contents of which are incorporated herein.

TECHNICAL FIELD OF THE INVENTION

The present invention relates to a snow groomer. More specifically, the present invention relates to a snow groomer of the type comprising a frame extending along a longitudinal axis; ten supporting wheels connected to the frame by respective axle shafts to form a row of five supporting wheels on each longitudinal side of the frame, each supporting wheel on one longitudinal side of the frame facing a supporting wheel on the opposite longitudinal side of the frame, so that facing pairs of supporting wheels define a first axle, a second axle, a third axle, a fourth axle, and a fifth axle; and two tracks, each looped about the supporting wheels aligned along a respective longitudinal side of the frame.

BACKGROUND OF THE INVENTION

A snow groomer of the type described above is used for surface grooming ski runs of all types, and must therefore be capable of maneuvering freely regardless of the slope and size of the run. Since the overall weight and size of the groomer, however, seriously impair maneuverability and climbing performance on very steep slopes, snow groomer manufacturers have opted to keep the overall weight within a relatively low range, thus precluding the use of high-power engines, which would otherwise be desirable for certain grooming jobs and to improve efficiency.

SUMMARY OF THE INVENTION

It is an object of the present invention to provide a snow groomer designed to reduce or eliminate as far as possible the drawbacks of the known art, and which at the same time is relatively cheap and easy to produce.

According to the present invention, there is provided a snow groomer comprising a frame extending along a longitudinal axis; ten supporting wheels connected to the frame by respective axle shafts to form a row of five supporting wheels on each longitudinal side of the frame, each supporting wheel on one longitudinal side of the frame facing a supporting wheel on the opposite longitudinal side of the frame, so that facing pairs of supporting wheels define a first axle, a second axle, a third axle, a fourth axle, and a fifth axle; and two tracks, each looped about the supporting wheels aligned along a respective longitudinal side of the frame; an engine assembly of over 430 horsepower, and by having a mass distributed as follows: 16%+/−2% on the first axle; 20%+/−2% on the second axle; 20%+/−2% on the third axle; 22%+/−2% on the fourth axle; and 22%+/−2% on the fifth axle.

Tests conducted by the Applicant show the present invention provides for achieving highly powerful, heavy groomers, which, at the same time, are highly maneuverable and capable of climbing extremely steep slopes.

BRIEF DESCRIPTION OF THE DRAWINGS

A non-limiting embodiment of the present invention will be described by way of example with reference to the accompanying drawings, in which.

DETAILED DESCRIPTION OF ONE EMBODIMENT OF THE INVENTION

Figure 1:
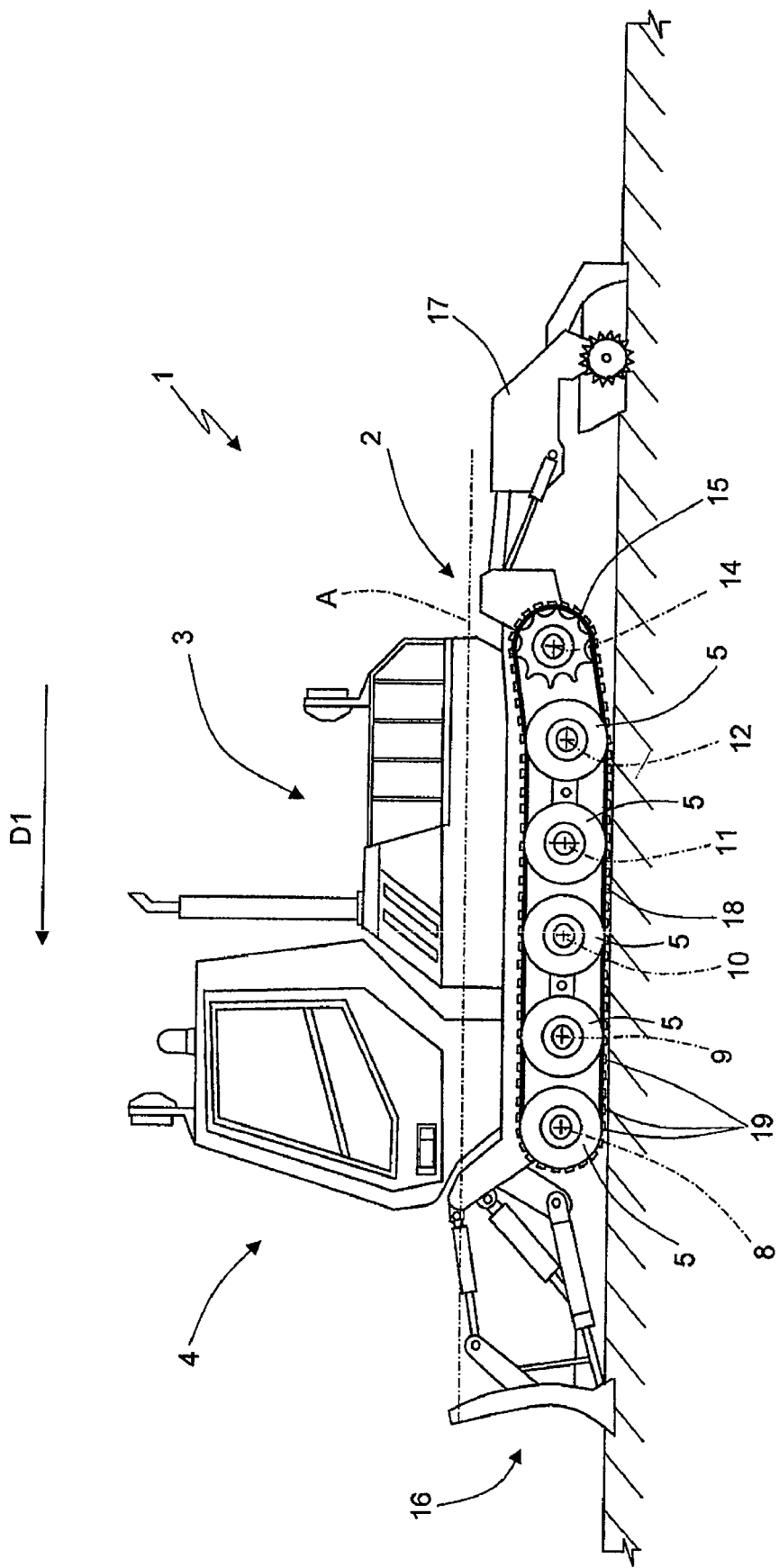
FIG. 1 shows a side view, with parts removed for clarity, of the snow groomer according to the present invention.

Number 1 in FIG. 1 indicates as a whole a snow groomer comprising a frame 2 extending along a longitudinal axis A and travelling in a direction D1.

Figure 2:
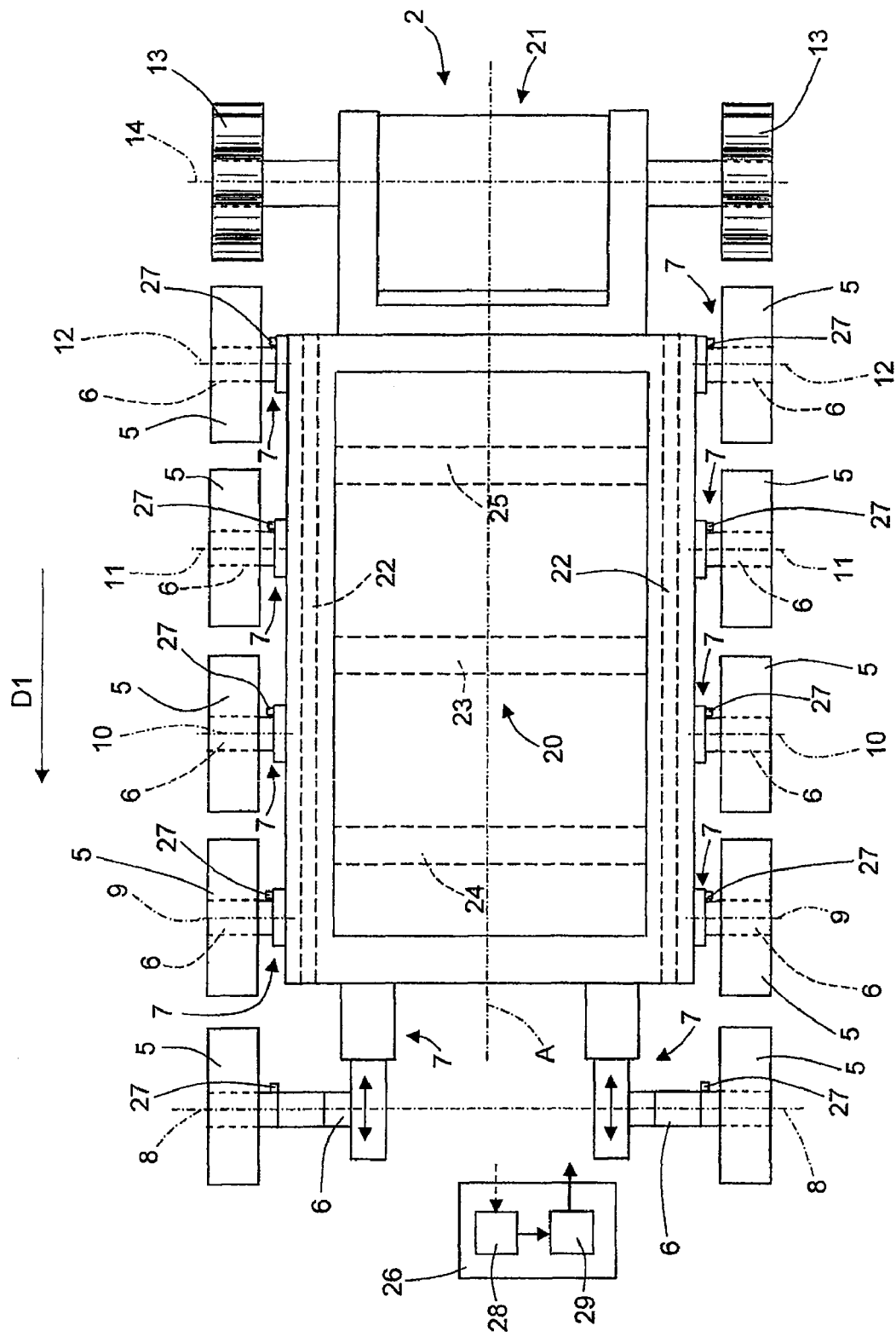
FIG. 2 shows a schematic plan view, with parts removed for clarity, of the FIG. 1 snow groomer.

Snow groomer 1 comprises an engine assembly 3 over the rear of frame 2; a cockpit assembly 4 over the front of frame 2; and ten supporting wheels 5 connected to frame 2 by respective axle shafts 6 and respective powered adjusting devices 7 (FIG. 2).

With reference to FIG. 2, supporting wheels 5 are divided into two rows of five supporting wheels 5 each; each row comprises five supporting wheels 5 aligned along a respective longitudinal side of frame 2; and each supporting wheel 5 on one longitudinal side of frame 2 faces a supporting wheel 5 on the opposite longitudinal side of frame 2, so that facing pairs of supporting wheels 5 define a first axle 8, a second axle 9, a third axle 10, a fourth axle 11, and a fifth axle 12. The term "axle" is used in a hypothetical sense, since opposite supporting wheels 5 are not actually connected by a shaft, and each supporting wheel 5 and relative axle shaft 6 are adjustable by the corresponding powered adjusting device 7 independently of the other supporting wheels 5 and axle shafts 6. The movements of supporting wheels 5, however, take place in a plane perpendicular to the FIG. 2 plane, and are so small as not to prejudice the axle definition.

With reference to FIG. 2, snow groomer 1 comprises two drive wheels 13, which are connected to frame 2, are located along a common axle 14, on opposite sides of frame 2, are driven by respective hydraulic motors (not shown in the drawings), and, in use, are raised off the ground as shown in FIG. 1.

With reference to FIG. 1, snow groomer 1 comprises two tracks 15, each looped about five supporting wheels 5 aligned along a respective longitudinal side of frame 2, and about a respective drive wheel 13.

In FIG. 2, each of axles 9 to 12 and axle 14 are indicated by a dot-and-dash line.

With reference to FIG. 1, snow groomer 1 is equipped with a blade 16 extending in front of and hinged to frame 2, and a snow tiller 17 located behind and hinged to frame 2.

Engine assembly 3 of snow groomer 1 is over 430 horsepower, and renders snow groomer 1 as a whole relatively heavy. Engine assembly 3 and cockpit assembly 4 are arranged on frame 2 so that the overall mass (or mass distribution) of snow groomer 1 is distributed as follows: 16%+/−2% on first axle 8; 20%+/−2% on second axle 9; 20%+/−2% on third axle 10; 22%+/−2% on fourth axle 11; and 22%+/−2% on fifth axle 12.

The above weight distribution corresponds to a condition in which both blade 16 and tiller 17 are raised slightly off the ground.

Each track 15 is a total length of over 8.5 meters, comprises a gripping branch 18, and has studs 19 distributed along track 15. The length of gripping branch 18 is determined by the distance between first axle 8 and fifth axle 12. And studs 19 extend crosswise to longitudinal axis A, and are distributed along track 15 so that there are more than seventy-five studs 19 along gripping branch 18.

In a variation of the present invention, the position of engine assembly 3 is adjustable with respect to frame 2 along longitudinal axis A. More specifically, engine assembly 3 is fitted to frame 2 to slide along longitudinal axis A.

In another variation of the present invention, the position of cockpit assembly 4 is adjustable with respect to frame 2 along longitudinal axis A. More specifically, cockpit assembly 4 is fitted to frame 2 to slide along longitudinal axis A.

With reference to FIG. 2, frame 2 comprises a central body 20 and a backframe 21 directly supporting drive wheels 13 and tiller 17.

In one variation, central body 20 has two guides 22 parallel to longitudinal axis A, engine assembly 3 and cockpit assembly 4 are mounted to slide along guides 22, and snow groomer 1 is equipped with actuating and stop devices (not shown in the drawings) to lock engine assembly 3 and cockpit assembly 4 in respective given positions with respect to frame 2.

In another variation, snow groomer 1 comprises ballast 23 connected to and underneath frame 2, and selectively adjustable in position. Preferably, ballast 23 is mounted to slide along longitudinal axis A, and can be locked selectively in a number of different positions.

Snow groomer 1 preferably comprises a plurality of ballasts 23, 24, and 25, each adjustable with respect to frame 2.

Snow groomer 1 is equipped with a control unit 26, which receives load signals from a number of sensors 27, each located on a respective axle shaft 6 to emit a load signal related to the load on respective axle shaft 6.

Control unit 26 comprises a comparing block or unit 28 for comparing the load on each of axles 9-12 with predetermined values and a control block or unit 29 for emitting signals for controlling powered adjusting devices 7.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A snow groomer comprising:
a frame extending along a longitudinal axis;
ten supporting wheels connected to the frame by respective axle shafts to form a row of five supporting wheels on each longitudinal side of the frame, each supporting wheel on one longitudinal side of the frame facing a supporting wheel on the opposite longitudinal side of the frame, so that facing pairs of supporting wheels define a first axle, a second axle, a third axle, a fourth axle, and a fifth axle;
two tracks, each track looped about the supporting wheels aligned along a different one of the respective longitudinal sides of the frame;
an engine assembly of over 430 horsepower;
a plurality of sensors, each located at a respective axle shaft to emit a load signal related to a load on the respective axle shaft; and
a control unit configured to receive said load signals and to calculate mass distributions of the snow groomer on the first axle, the second axle, the third axle, the fourth axle, and the fifth axle such that the mass distribution of the snow groomer is as follows:
(a) 16%+/−2% on the first axle;
(b) 20%+/−2% on the second axle;
(c) 20%+/−2% on the third axle;
(d) 22%+/−2% on the fourth axle; and
(e) 22%+/−2% on the fifth axle.

2. The snow groomer of claim 1, wherein each track is a total length of over 8.5 meters.

3. The snow groomer of claim 1, wherein each track comprises a gripping branch, studs are fixed to the track, each stud extending crosswise to the longitudinal axis and spacing of the studs and length of the gripping branch being such that the studs along the gripping branch number more than seventy-five.

4. The snow groomer of claim 1, which includes a plurality of powered adjusting devices, each located between a respective axle shaft and the frame to move the respective supporting wheel, wherein the control unit comprises a comparing module configured to compare the load on each axle shaft with given values, and a control module configured to emit control signals to control movements of the powered adjusting devices.

5. The snow groomer of claim 1, wherein the engine assembly is connected to the frame adjustably along the longitudinal axis.

6. The snow groomer of claim 5, wherein the engine assembly is connected to the frame to slide along the longitudinal axis.

7. The snow groomer of claim 1, which includes a cockpit assembly connected to the frame adjustably along the longitudinal axis.

8. The snow groomer of claim 7, wherein the cockpit assembly is connected to the frame to slide along the longitudinal axis.

9. The snow groomer of claim 1, which includes at least one ballast connected to the frame adjustably along the longitudinal axis.

10. The snow groomer of claim 9, which includes a plurality of ballasts, each ballast being connected to the frame adjustably along the longitudinal axis.

11. A snow groomer comprising:
a frame extending along a longitudinal axis;
ten supporting wheels connected to the frame by respective axle shafts to form a row of five supporting wheels on each longitudinal side of the frame, each supporting wheel on one longitudinal side of the frame facing a supporting wheel on the opposite longitudinal side of the frame such that facing pairs of supporting wheels define a first axle, a second axle, a third axle, a fourth axle, and a fifth axle;
two tracks, each track looped about the supporting wheels aligned along a different one of the respective longitudinal sides of the frame;
an engine assembly of over 430 horsepower;
a plurality of sensors, each located at a respective axle shaft to emit a load signal related to a load on the respective axle shaft;
a plurality of powered adjusting devices, each located between a respective axle shaft and the frame to move the respective supporting wheel; and
a control unit configured to receive said load signals and to calculate mass distributions of the snow groomer on the first axle, the second axle, the third axle, the fourth axle, and the fifth axle, wherein the control unit includes: a comparing module configured to compare the load on each axle shaft with designated values, and a control module configured to emit control signals to control movements of the powered adjusting devices.

* * * * *